(12) United States Patent
Cantillo

(10) Patent No.: US 9,851,462 B2
(45) Date of Patent: Dec. 26, 2017

(54) COMPUTERIZED METHOD OF CHARACTERIZING A GEOLOGICAL REGION OF INTEREST AND COMPUTER PROGRAM IMPLEMENTING THIS METHOD

(71) Applicant: TOTAL SA, Courbevoie (FR)

(72) Inventor: Juan Cantillo, Pau (FR)

(73) Assignee: TOTAL SA, Courbevoie (FR)

( * ) Notice: Subject to any disclaimer, the term of this patent is extended or adjusted under 35 U.S.C. 154(b) by 540 days.

(21) Appl. No.: 14/390,666

(22) PCT Filed: Dec. 4, 2012

(86) PCT No.: PCT/EP2012/074361
§ 371 (c)(1),
(2) Date: Oct. 3, 2014

(87) PCT Pub. No.: WO2013/149687
PCT Pub. Date: Oct. 10, 2013

(65) Prior Publication Data
US 2015/0057936 A1    Feb. 26, 2015

Related U.S. Application Data

(60) Provisional application No. 61/619,765, filed on Apr. 3, 2012.

(51) Int. Cl.
G01V 1/00    (2006.01)
G01V 1/30    (2006.01)
G01V 1/34    (2006.01)
G06F 11/30   (2006.01)

(52) U.S. Cl.
CPC .............. G01V 1/308 (2013.01); G01V 1/345 (2013.01)

(58) Field of Classification Search
CPC ...................................... G01V 1/308
See application file for complete search history.

(56) References Cited

FOREIGN PATENT DOCUMENTS

WO    WO 2009/151931    12/2009
WO    WO 2010/054282 A1    5/2010
WO    WO 2010054282 A1 *    5/2010    ............... G01V 1/24

\* cited by examiner

*Primary Examiner* — Phuong Huynh
(74) *Attorney, Agent, or Firm* — Patterson Thuente Pedersen, P.A.

(57) ABSTRACT

A data set comprises data obtained by seismic imaging of a region of interest during an observation period. An intrinsic geological variability of a region is determined from the comparison of reception signals for neighbor bins as a function of a difference in signal geometry for the neighbor bins.

9 Claims, 5 Drawing Sheets

COMPUTERIZED METHOD OF CHARACTERIZING A GEOLOGICAL REGION OF INTEREST AND COMPUTER PROGRAM IMPLEMENTING THIS METHOD

RELATED APPLICATIONS

The present application is a National Phase entry of PCT Application No. PCT/EP2013/074361, filed Dec. 4, 2012, which claims priority from U.S. Provisional Patent Application No. 61/619,765, filed Apr. 3, 2012, said applications being hereby incorporated by reference herein in their entirety.

FIELD OF THE INVENTION

The instant invention relates to computerized methods of characterizing geological regions of interest.

BACKGROUND OF THE INVENTION

Seismic imaging has been used to characterize a geological region of interest. Since, however, repeatability of seismic imaging is weak, using this technology to monitor the geological region of interest over time is difficult. Indeed, it is difficult to determine whether the change in seismic images is due to the change of the monitored region itself, or to the change in the imaging conditions.

In particular, the instant invention aims at improving this situation.

SUMMARY OF THE INVENTION

To this aim, it is provided a computerized method of characterizing a geological region of interest comprising:
  providing a data set comprising data obtained by seismic imaging of the region of interest during an observation period, said data set comprising, for each bin of the region of interest, data related to emission signal, reception signal, and signal geometry,
  determining an intrinsic geological variability of a bin of the region of interest from the comparison of reception signals for neighbour bins as a function of a difference in signal geometry for said neighbour bins.

In this way, seismic imaging is used not only to image the geological region of interest, but also to find out how geologically variable it is. This variation will be useful for future imaging of the region of interest.

In some embodiments, one might also use one or more of the features as defined in the dependent claims.

BRIEF DESCRIPTION OF THE DRAWINGS

Other characteristics and advantages of the invention will readily appear from the following description of one of its embodiments, provided as a non-limitative example, and of the accompanying drawings.

On the drawings.

On the different Figures, the same reference signs designate like or similar elements.

DETAILED DESCRIPTION

Summary

It is well established today that most of the repeatability damage in marine time-lapse seismic stems from the inevitable positioning errors made during the redeployment of sources and receivers. However, despite several works on this important topic we still lack a consistent framework tying such errors with what we call "repeatability noise" in a quantitative—and therefore predictive way. The stakes are high, since having control over the expected levels of 4D noise in a time-lapse survey—for instance trough sound navigation specifications—is paramount for making the most out of our monitored reservoirs at reasonable cost. Recent research has started to lift the veil on this issue by providing a new way to look at the 4D problem from the perspective of perturbation theory, leading among other results to the introduction of the SDR attribute as a true, unbiased measure of time-lapse repeatability. Building on this framework, the main ideas of a working methodology allowing the 4D prediction problem to be tackled properly are presented here.

Figure 1:
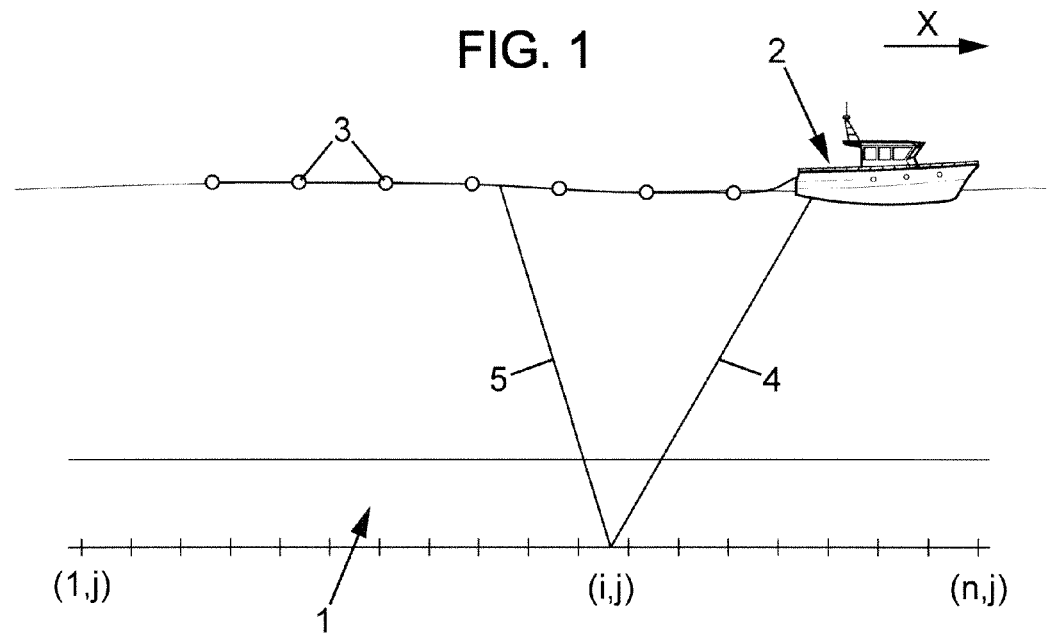
FIG. 1 is a schematic view of a seismic imaging method.
Figure 8:
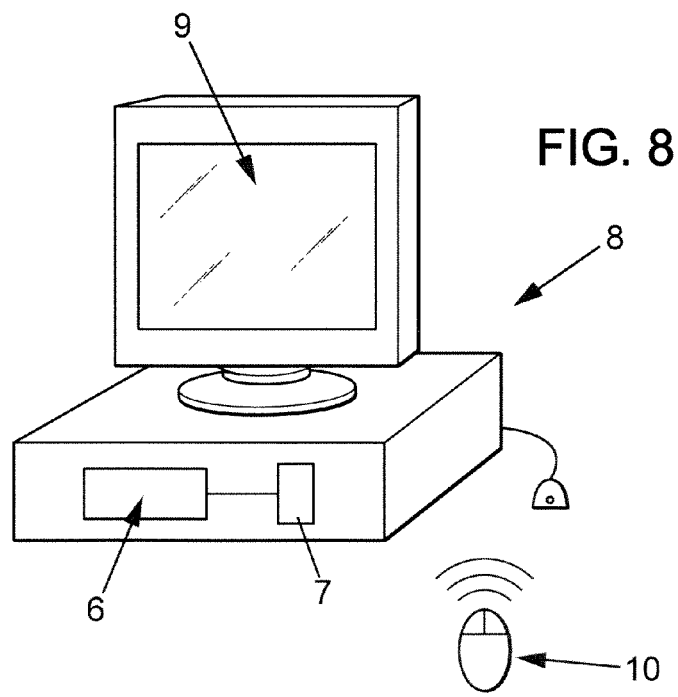

FIG. 1 schematically shows an example of an ongoing seismic imaging method. Seen from above, the geological region of interest 1 is divided into a plurality of bins $(1,1), \ldots, (i,j), \ldots, (m,n)$ of suitable dimensions. FIG. 1 shows the row j of this region. A seismic experiment can for example use a boat 2 moving along a direction X and trailing behind it a plurality of sensors 3 (as an array of columns and rows more or less parallel to the average surface of the geological region of interest). The boat 2 is adapted to emit an emission signal 4, which is reflected by earth toward the sensors. A given sensor 3 detects a detection signal 5 associated to the emission signal 4 and a region (i,j) (or "bin") of the geological region of interest. Emission signals 4 may be considered all equal, or their variations might also be taken into account in the survey. This experiment is performed during an observation period T. This experiment provides a data set comprising associations of emitted signal, received signal, and signal geometry.

Reminders on the 4D Perturbation Model

The next lines present some necessary reminders about the framework and notations upon which this work is based.

In any time-lapse survey, the raw 4D signal is the difference of two similar measurements b and m that can be described from the usual convolutional model:

$$b = w_1 \cdot e_1 + n_1$$

$$m = w_2 \cdot e_2 + n_2, \qquad (1)$$

where $w_i$ represents the emitted signal, $e_i$ represents the earth response for this emitted signal, and $n_i$ a noise.

Since the monitor experiment attempts to reproduce the base acquisition faithfully in order to capture small production-related changes ΔP, the difference in experimental conditions ΔG should be small enough to consider the following perturbation hypotheses:

$$w_2 \approx (1+\epsilon) \cdot w_1 * \delta_v,$$

$$e_2 \approx e_1 + (\partial e_1/\partial P)\Delta P + (\partial e_1/\partial G)\Delta G \quad (2)$$

The first equation summarizes our effort to repeat the base survey. Since we actively try to cancel any differences that may exist between the two wavelets at the very first stages of acquisition and pre-processing, their far-field signatures should only differ from geometrical timeshift (which is always significant) and relative energy spreading (which is generally not). The second equation states that the response of the earth is similar in the two experiments, with differences arising from production and the local spatial variability of the earth's impulse response with regards to ray-path geometry. Combining these equations leads to:

$$m = \delta_\tau * b + d \quad (3),$$

where d is a distortion term, made of a sum of random, production and geological terms according to our hypotheses. Its magnitude can be quantified by the signal-to-distortion ratio SDR, defined by:

$$SDR = \|b\|^2/\|d\|^2 = (\Sigma_k b_k^2)/(\Sigma_k d_k^2) \quad (4)$$

In simple terms, SDR quantifies the energy of the time lapse difference that would be theoretically measured with an absolutely perfect gain and flawless timeshift equalisation. By construction, it characterizes the intrinsic shape similarity between base and monitor traces. A repeatability scale indexed by SDR is given in Table 1.

TABLE 1

| $SDR_{dB}$ | 0 | 5 | 10 | 15 | 20 | 25 | 30 |
|---|---|---|---|---|---|---|---|
| SDR | 1 | 3.1 | 10 | 31.6 | 100 | 316 | 1000 |
| Repeatability | POOR | FAIR | GOOD | | EXCELLENT | | |

From a practical standpoint, it is known that SDR can be estimated e.g. using the formula $$SDR = \max(x_{bm})^2/(1-\max(x_{bm})^2),$$

Where $x_{bm}$ is the normalized cross-correlation function between the base b and the monitor m.

Introducing the Coherency Length

In the absence of production ($\partial e_1/\partial P = 0$), the distortion term is purely composed of undesired contributions of random and/or geological origin. However, their relative importance is far from being the same. To the author's experience, the geological distortion energy is by far predominant, with effects about one to two orders of magnitude larger than those of random origin in seismic time-lapse of nominal quality and setting up de facto the real limit to our 4D fidelity. If we drop the random terms in d we obtain the following expression for SDR:

$$SDR \approx (L_{coh}/\Delta G)^2 \text{ with } L_{coh} = \|e_1\|/\|(\partial e_1/\partial G)\| \quad (5)$$

For two base and monitor traces acquired over a given region of interest (or "bin") with slightly different geometry, the SDR relates the geometry error ΔG with a fixed parameter $L_{coh}$ whose value depends both on the observed base trace (through $\|e_1\|$) and the way it would look under slightly different geometry conditions (through the derivative) exclusively. Note the remarkable fact that under our hypotheses, SDR is totally independent from the actual characteristics of the monitor trace itself. Now, since SDR is a dimensionless ratio, $L_{coh}$ should be expressed in the units of the geometry error, usually meters. We naturally call this parameter the coherency length: it appears as a characteristic attribute of the bin of interest under our experimental conditions such as investigation depth, processing step, offset range etc. From a practical standpoint, the SDR will be 1 (0 dB) whenever the geometry error will match $L_{coh}$. Since this should be considered as the worst tolerable case in timelapse repeatability, the coherency length of a given bin represents also the maximum geometry error that should ever be tolerated over this bin.

General Principles of Coherency Length Estimation

Figure 2A:
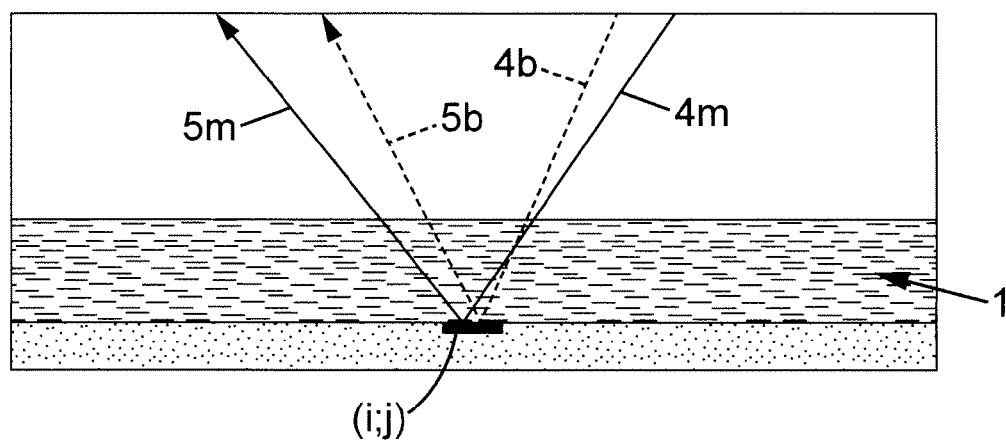
FIGS. 2a and 2b are enlarged view of FIG. 1 for different earth geological conditions.
Figure 2B:
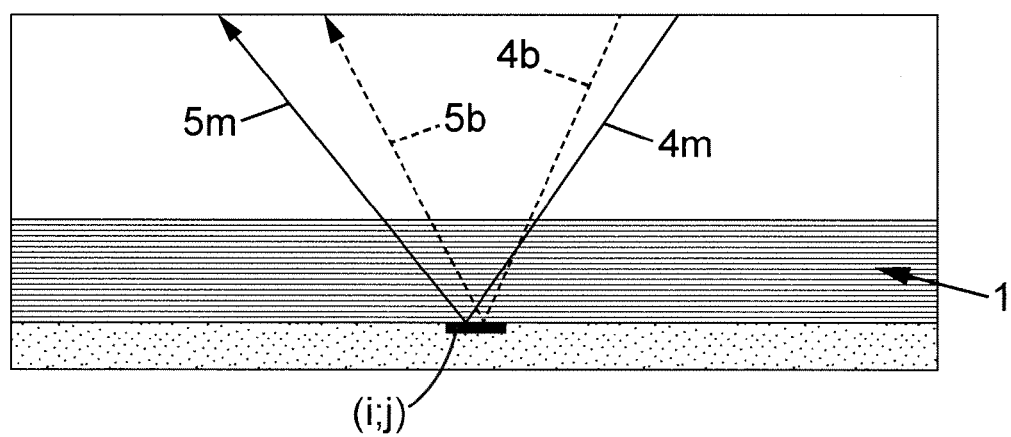

What equation (5) tells us is fundamental and simple to understand intuitively. When observing a pair of base/monitor traces over a selected bin, a given geometry error ΔG will produce more repeatability problems if the aforementioned bin is seen through complex geology than in areas where raypaths only encounter calm and slowlyvariant geological features. This is sketched schematically in FIGS. 2a and 2b. The base emitted signal 4b is reflected by the region of interest (i,j) as a reflected signal 5b. The monitor emitted signal 4m is reflected by the same region of interest (i,j) as a reflected signal 5m. The differences of locations of the emission point, reflection point and detection point between the two signals correspond to the geometry error ΔG. FIGS. 2a and 2b respectively show the case of a strong/weak heterogeneity in the geological region of interest 1. In the case of FIG. 2b, the heterogeneities seen by both the base and monitor traces are similar, whereas the heterogeneities seen by the base and monitor traces differ in the case of FIG. 2a.

From a quantitative standpoint, if we knew the value of $L_{Coh}$ for every bin of our base dataset we would be able to predict the corresponding SDR with the sole knowledge of the expected distribution of ΔG before shooting the actual monitor survey (before performing a new seismic imaging method). Likewise, if we required a target SDR to be achieved for every bin, we could set up limits on the maximum ΔG that should be tolerated at every bin in order to meet the repeatability target. Whatever the case, both are 4D feasibility problems that all revolve around the knowledge or estimation of $L_{COh}$ in the base dataset.

So, we measure or estimate this parameter. This can for example be performed through a statistical analysis of the variability in signal characteristics among adjacent (neighbour) base traces in the area of interest. As shown on FIG. 3a, we want to extract the coherency length for a reference bin denoted with subscript 0 (corresponding to the region (i,j) in the above example). The base trace hitting this bin will be denoted $b_0$, and its generic shooting geometry $G_0$. In order to estimate $L_{coh}$, we can propose the following generic methodology:

1. Define a neighborhood around the reference bin containing N base traces denoted $(b)_1, \ldots, _N$. Note by $(G)_1, \ldots, _N$ the geometries with which they were shot in the base dataset;
2. For every trace in (1, N), calculate $SDR_n = SDR(b_0, b_n)$ and $(\Delta G)_n = G_n - G_0$.
3. Produce a $SDR_n$ vs. $(\Delta G)_n$ variogram, and derive the $L_{COh}$ that best honors the relation $SDR = (L_{coh}/\Delta G)^2$.

Other methods could be used to determine $L_{coh}$ from $SDR_n$ and $\Delta G)_n$ than using a graphical solution such as a variogram.

Figure 3A:
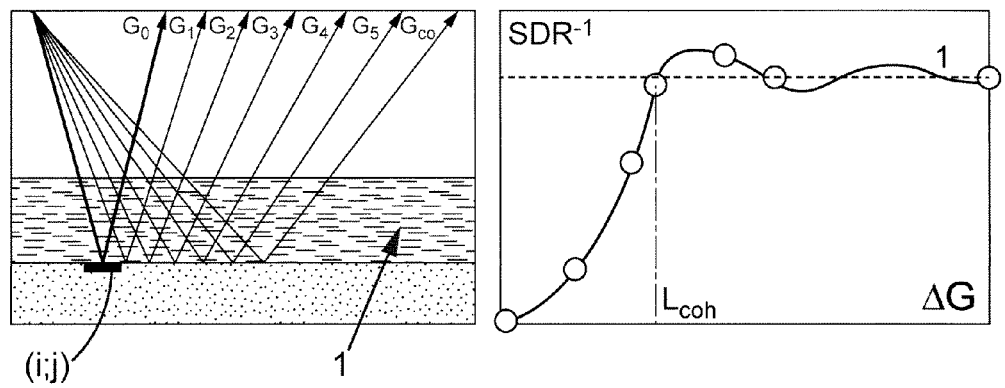
FIGS. 3a and 3b are schematic views, for different earth geological conditions, showing each, on the left-hand side, seismic imaging, and on the right hand-side a variogram of $SDR^{-1}$ as a function of $\Delta G$.
Figure 3B:
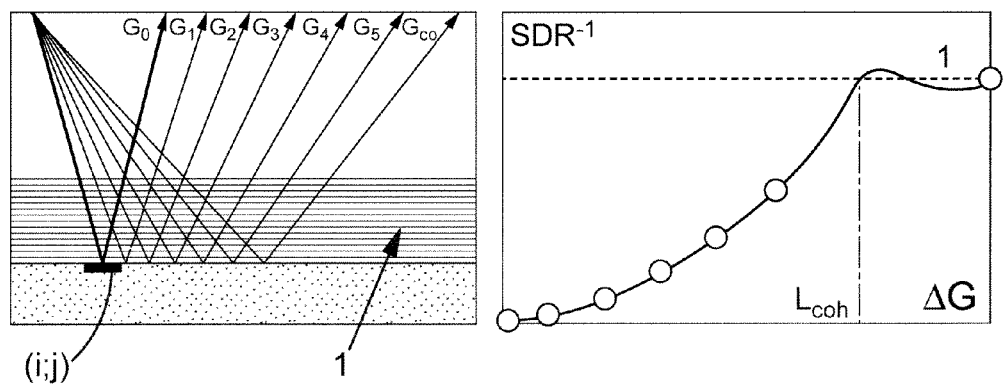

A good conceptual understanding of how this variogram should ideally work can be achieved with FIGS. 3a and 3b, in which the inverse of SDR is worked out as a function of ΔG for the sake of simplicity in our explanation. For now, think of ΔG as a generic geometry error that can be measured with a scalar value, in meters.

If we were to compare the reference trace with itself, we would have $\Delta G_0=0$ and no geological distortion should be measured. This means infinite SDR, or equivalently, $SDR^{-1}=0$. The leftmost point in the $SDR^{-1}$ vs. ΔG cross-plot is therefore situated at (0, 0) in the variogram. If we were to compare the reference trace with traces that are very distant in our base dataset, say ΔG≈∞, there is no reason whatsoever for them to be similar. However, we can safely expect them to have comparable energy, simply because they belong to the same survey. For this reason, for all these traces we can expect to have SDR≈1, the sill of our variogram. Finally, in the ranges of moderate ΔG, the perturbation model should hold. Recall that the same ΔG will produce higher distortion in areas with high subsurface variability than in areas where geology is calm. Distortion will therefore build faster in the first case (FIG. 3a—strong heterogeneities) than in the second (FIG. 3b—weak heterogeneities), producing the characteristic curves of FIGS. 3a and 3b. The coherency length $L_{coh}$ of our bin is the range of the variogram, i.e. the ΔG above which $SDR^{-1}$ is consistently less than a predetermined threshold, for example less than 1 (0 dB). This is a self-contained operation that only involves the base dataset, with no input whatsoever from the monitor survey.

Practical Aspects of Coherency Length Estimation

What "base dataset" should we use? Regularization destroys our initial geometry information and stacked traces contain energy contributions from multiple source/receiver pairs. For these simple reasons, stacks or migrated sections do not seem to be adapted to the task of $L_{coh}$ estimation. Among all the pre-stack data gathering possibilities that are available, non-regularized common offset cubes are best suited for our studies. Indeed, they contain information about (almost) all bins in the survey, their traces are pretty homogeneous in terms of acquisition geometry and more importantly, straightforward geology information is embedded on them.

Figure 4A:
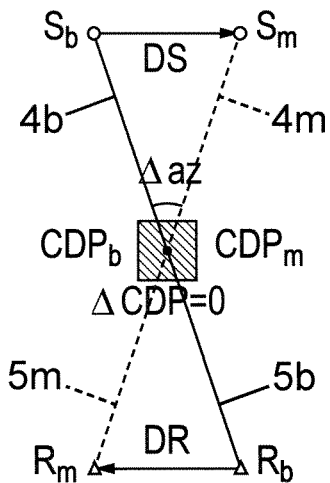
FIGS. 4a and 4b show two different assumptions of seismic imaging.

What about the exact expression of ΔG? Given the known coordinates of the base source and receiver, the positioning of the monitor devices defines a problem with 4 degrees of freedom in streamer time-lapse ($\Delta x_{sou}$, $\Delta y_{sou}$, difference between the sources of the monitor and base along the axis x and y, respectively, $\Delta x_{rec}$ and $\Delta y_{rec}$, the same for the receiver). In theory, an exact definition of the geometry error requires therefore the use of a multidimensional vector. According to a first embodiment, a 4D analysis describes positioning errors with a symmetric and simplistic geometry that reduces the problem with almost no exception to DS+DR and Δaz, referring to FIG. 4a (where reflection is not shown), respectively the differences in source position, receiver position, and azimuth. This first embodiment is a simpler approach, which however might be enriched, because it makes some approximations: First, it assumes that base and monitor offsets are strictly equal, which is seldom the case. Second, the positioning attributes it uses are perfectly correlated, Since DS+DR is proportional to the sine of Δaz/2. More importantly, it does not take into account the difference in reflection points (ΔCDP), which seems to be the main geometrical attribute behind geometrical non-repeatability. Observations show that differences in azimuth are important as well, but that their impact is secondary.

Figure 4B:
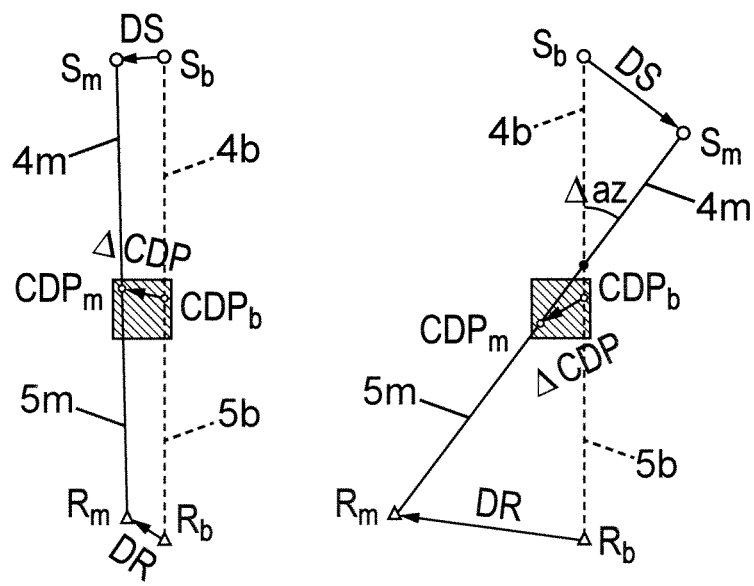

According to a second embodiment, one may therefore refer to the more realistic configurations shown in FIG. 4b.

For example, ΔG can be used in the estimation process as ΔG=2 ΔCDP=‖DS+DR‖, where DS and DR are vectors. Note some of its limitations: it does not carry any azimuthal information and whenever DS and DR will be collinear and opposite in sign ΔG will be mathematically zero, although a difference in azimuth may subsist in real life. This point can be improved in a third embodiment.

Thus, the above determination of the parameter $L_{coh}$ for a given bin can be repeated for all bins of the geological region of interest, in order to obtain a map of this parameter in the whole region of interest. This enables to determine the parts of the geological region of interest with high distortion and those with low distortion. This map can be used for example to determine parameters of a future seismic imaging acquisition. These parameters can for example be the lay-out of the sensors, or the frequency of the acquisition, which may be chosen to differ over the whole geological region of interest.

Example of Application

Figure 5:
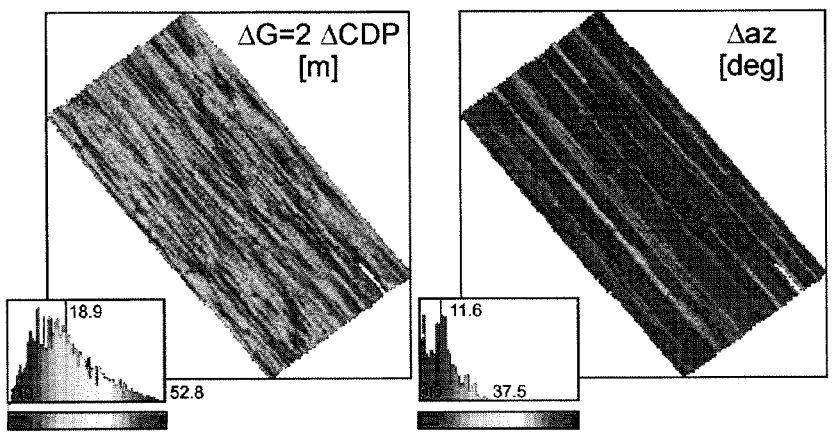
FIG. 5 shows an experimental measurement ($\Delta G$ on the left-hand side and $\Delta az$ on the right-hand side)

Using data from a recent 4D survey in offshore Gulf of Guinea, non-regularized offset classes were analyzed over a small 4×2 km area where no 4D signal was expected. Maps of the observed Δaz and ΔG measured from real base—monitor differences in geometry in our survey are shown on FIG. 5, respectively left and right, for a mid-offset class with source-receiver distances in the ranges of 1000 m. Maps of the observed SDR between base and monitor were calculated on a 300-ms time window in the overburden, showing that the quality of the acquisition was fair and that overall SDR values decrease with offset class.

Figure 6:
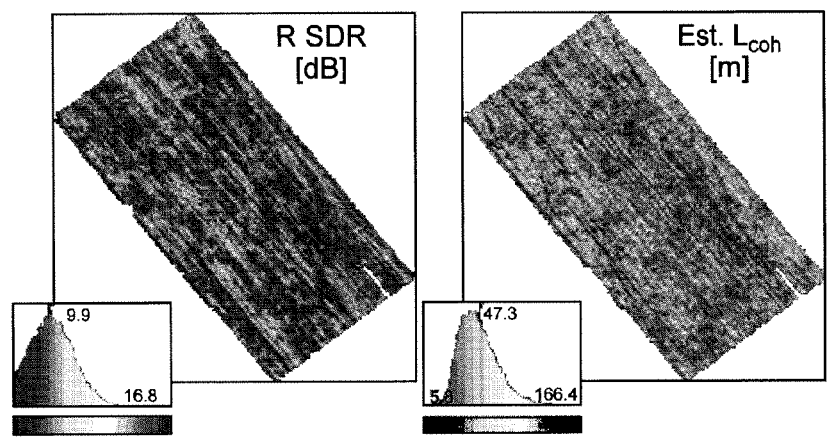
FIG. 6 shows an output of the above method (real SDR on the left-hand side and estimated $L_{coh}$ on the right-hand side)

With these observations at hand, we set in the task of producing an estimation of the observed SDR maps without the use of the monitor data. As a first step in our analyses, we ran our self-contained prediction methodology independently for each bin of our offset classes. We observed that $L_{coh}$ values decrease with increasing offset class, which intuitively makes sense: obliquity favors distortion because of smaller energies and longer raypaths. Also, it was observed that $L_{coh}$ is pretty consistent among offset classes, and that reproducible features with spatial organization that make sense from a geological standpoint stand out clearly. This remarkable fact shows the stability of the method, given that the calculation of $L_{Coh}$ is performed independently for each bin. FIG. 6 shows the actual SDR (left-hand side) and the estimated coherency length (right-hand side) for our selected mid offset class.

Figure 7:
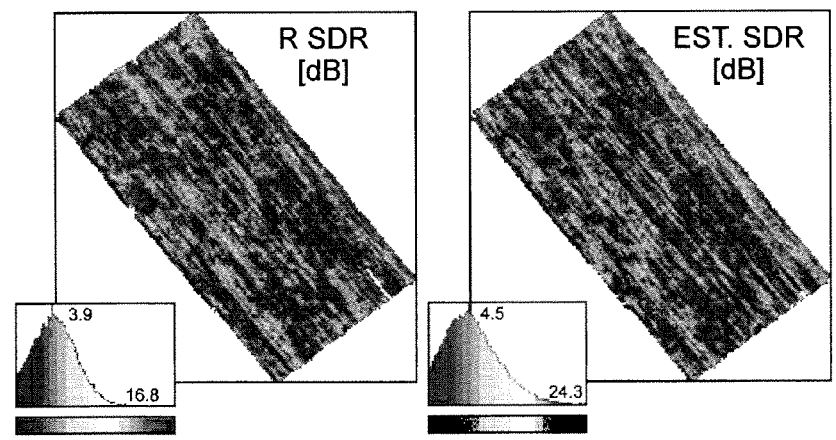
FIG. 7 shows an output of the above method (real SDR on the left-hand side and estimated SDR on the right-hand side), and
  FIG. 8 schematically shows a device adapted to implement the method.

As a final step, we used the observed geometrical errors in conjunction with our coherency lengths to make a prediction of SDR. As shown in FIG. 7, the results are encouraging: although we tend to overestimate the predicted SDR (right-hand side of FIG. 7) slightly, we are able to explain most of it and faithfully capture its variations and spatial organization.

The observed misfit should not come as a total surprise, given that we neglected the random terms in the perturbation model and since our ΔG, as defined, carries no azimuthal information. Slightly better results have been obtained with the introduction of a nugget effect and the use of modified geometry error ΔG with artificially added azimuthal information.

Finally, we have noted that the distribution of the error $\Delta_G DP$ seems to be unchanged among different offset classes. A detailed analysis of the problem gives a hint of solution to this apparently puzzling fact: $\Delta_G DP$ can be seen as a random variable $\Delta_G DP=((x_b-x_m)^2+(y_b-y_m)^2)^{1/2}$ where $x_b$, $y_b$, $x_m$, and $y_m$ represent the coordinates of the reflection points in the bin of interest, with these four quantities following uniform distribution laws in our bin. The average value of $\Delta_G DP$ can be shown to follow a distribution similar as the one of FIG. 5 with an average value near half the length of the bin's diagonal, which has important practical consequences. First, if one wants to perform a 4D feasibility study using our methodology, it is perhaps not absolutely necessary to generate a $\Delta G$ distribution that matches the expected featherings, steering efforts, currents etc. One might start by drawing observations from the above random variable to have a good shot at SDR. Second, and perhaps more important: reducing the bin size should reduce de facto the geometrical errors observed, directly improving the 4D signal.

CONCLUSIONS

We are able to predict with a good accuracy the repeatability levels of a 4D acquisition from the sole knowledge of the base dataset and the expected or known geometry errors. The method uses the estimation of the intrinsic variability of the earth response over the region of interest under our experimental and observation conditions.

A geometrical parameter controlling geometric non-repeatability seems to be the difference in reflection points $\Delta_C DP$. Azimuthal differences come second. Note that although bin centering is performed by classical 4D processing, this step does not cancel the distortion between two traces coming from the initial fact that the reflection points are not the same. This distortion is carried all along the processing as a resilient scar in our 4D data.

The above method can be carried out on a programmable machine such as a processor 6 having access to a memory 7 containing the data set. The processor and the memory can be provided on the same machine 8, or distributed over a network, possibly among different countries. A display 9 can be provided so that a user can set some parameters of implementation of the above methods and/or display some results such as the maps shown on FIGS. 5-7. The user may use an interface 10 to communicate with the processor 6.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A computerized method of characterizing a geological region of interest comprising:
   providing a data set comprising data obtained by seismic imaging of the region of interest during an observation period, said data set comprising, for each bin of the region of interest, data related to an emission signal, a reception signal, and a signal geometry,
   repeatedly, for all bins of a region of interest, a processor determines an intrinsic geological variability of a bin of the region of interest from the comparison of reception signals for neighbour bins as a function of a difference in signal geometry for said neighbour bins, thereby obtaining a map of the intrinsic geological variability of the region of interest, and
   displaying said map on a display.

2. The method according to claim 1, wherein signal geometry comprises data related to location of emission of the emission signal, location of reception of the reception signal, and estimated location of reflection by earth of the emission signal.

3. The method according to claim 1 wherein said processor determines said intrinsic geological variability of a bin of the region of interest by estimating said intrinsic geological variability as a distance equal to the difference in geometry for which a difference in reception signals between bins is over a predetermined threshold.

4. The method according to claim 1, wherein comparison of two reception signals involves the signal-to-distortion ratio of a first of the two reception signals with respect to the second of the two reception signals.

5. The method according to claim 4, wherein the signal-to-distortion ratio is defined as $\|b\|^2/\|d\|_2$, when m is written as $m=\delta_r*b+d$, where b is the first reception signal, m the second reception signal, and $\delta_r$ is a factor representative of geometrical timeshifts of the first and second reception signals with respect to one another, and d is a random geological distortion term.

6. The method according to claim 5, wherein the signal to distortion ratio is estimated as $\max(x_{bm})^2/(1-\max(x_{bm})^2)$,
   where $x_{bm}$ designates the normalized cross-correlation function between the base and the monitor and max designates the maximum of a function.

7. The method according to claim 4, wherein the signal to distortion ratio is estimated from the random variable $\Delta GDP$ representing the distance between reflection points of the two reception signals in the bin.

8. A method of characterizing a geological region of interest comprising generating a data set by seismic imaging and applying the method of claim 1 to said data set.

9. A method of setting-up a seismic imaging acquisition comprising:
   performing a method according to claim 1, and
   determining parameters of said seismic imaging acquisition from a result of determining said variability.

* * * * *